Patented Aug. 8, 1933

1,921,078

UNITED STATES PATENT OFFICE 1,921,078

DYEING

Richard Frank Goldstein, Sedgley Park, Prestwich, and Alexander Young Livingstone, Huddersfield, England, assignors to Imperial Chemical Industries Limited, a Corporation of Great Britain No Drawing. Application September 10, 1931, Serial No. 562,188, and in Great Britain September 19, 1930

10 Claims. (Cl. 23—250)

This invention relates to the art of dyeing and more particularly to compositions of matter for use in the formation of azo dyes. In the art of producing insoluble colors, particularly the production of insoluble colors on fiber by padding with an alkaline solution of an aryl amide of 2:3-hydroxy-naphthoic acid and subsequently coupling on the fiber with a diazo compound, it has been observed that the alkaline solution of the aryl amide is unstable and becomes turbid on standing. The instability of the aryl amide solutions is aggravated by the use of hard water and a precipitate may be formed especially when, as is customary, the padding bath is made by diluting a concentrated liquor with water. The aforesaid difficulties have been especially prominent in the case of the more complex arylides and the sparingly soluble aryl amides.

It has previously been proposed to overcome the difficulties mentioned above by the use of sulphonated oils. See British Patent 307,777.

This invention has for objects the preparation of new compositions of matter, improvements in the art of azo dyeing, the production of novel solutions of aryl amides of 2:3-hydroxy-naphthoic acid and the production of improved padding solutions. Other objects will appear hereinafter.

The objects of this invention are accomplished by producing alkaline solutions of the aryl amides of 2:3-hydroxy-naphthoic acid containing a vegetable gum or gummy matter of vegetable origin. A sulphonated oil or may not be present. The invention is illustrated by the following examples in which the parts are given by weight.

Example I

Four (4) parts of a mixture of 96 parts of 2:3 - hydroxy - naphthoic - acid-beta-naphthylamide and 4 parts of gum arabic were mixed with 30 parts of Turkey-red oil and 24 parts of aqueous caustic soda of 62° Tw. To the paste so obtained 200 parts of boiling water were added and the mixture heated until a clear solution resulted. This clear solution was poured into 1000 parts of water. The dilute solution which was adapted for dyeing purposes remained clear for many hours. In a corresponding solution omitting the gum arabic deposition began in a few minutes and almost all of the aryl amide had separated from the solution in about two hours.

The new and improved solutions may be used by impregnating the fiber in the ordinary way, wringing or hydro-extracting, and developing with a suitable diazo body in the known manner.

Example II

Four (4) parts of a mixture of 95 parts of bis-2:3-hydroxy-naphthoyl-o-di-anisidide and 5 parts of gum arabic were mixed with 30 parts 5 parts of gum arabic were mixed with 30 parts of Turkey-red oil and 24 parts of aqueous caustic soda of 70° Tw. The resultant paste was combined with 200 parts of boiling water and the mixture heated until all of the solid was in solution. The resulting solution was poured into 1000 parts of water at 25° C. The resulting dilute solution did not deposit any solid for some hours whereas in the absence of gum arabic, deposition, either from a solution of 4 parts of aryl amide made up as above or from a more dilute solution, commenced in a few minutes and almost all of the aryl amide was out of solution in about one-half hour.

In carrying the invention into practical effect the aryl amide and a suitable portion, e. g. 3–7%, of the gum may be brought together in any convenient way. The solids may be mixed together readily for subsequent solution in aqueous alkali, the gum may be added to an alkaline solution of the aryl amide, or the gum may be added to the water to be used for dilution. Preferably the aryl amide is dissolved in aqueous alkali in the presence of the vegetable gum or the gum is added to a freshly prepared or freshly diluted alkaline solution of the aryl amide.

As stated above, a sulphonated oil may or may not be present in the final solution. It has usually been found advantageous to employ a sulphonated oil, for example, Turkey-red oil.

While it is not desired to limit the invention, it has been found that the most desirable results are obtained by the use of a vegetable gum such as gum-arabic or by a gummy material of vegetable origin, for example, dextrin or gluten.

The invention is applicable to any of the aryl amides of 2:3-hydroxy-naphthoic acid. Special mention may be made of 2:3-hydroxy-naphthoic-beta-naphthyl-amide having the probable formula

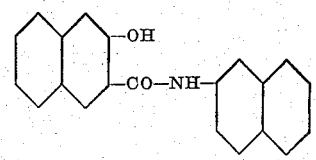

and bis-2:3-hydroxy-naphthoyl-o-di-anisidine.

By this invention the stability of alkaline solutions of 2:3-hydroxy-naphthoic aryl amides is improved and the known and existent difficulties effectively overcome and as will be obvious great savings in azo dyeing are possible.

As many apparently widely different embodiments of this invention may be made without departing from the spirit and scope thereof, it is to be understood that we do not limit ourselves to the specific embodiments thereof except as defined by the appended claims.

We claim:

1. Process for stabilizing solutions of 2:3-hydroxy-naphthoic aryl amides by adding a vegetable gum to a freshly prepared or freshly diluted alkaline solution of the aryl amide.

2. Process for the manufacture of preparations of 2:3-hydroxy-naphthoic aryl amides giving stable solutions in dilute alkali which comprises incorporating into the 2:3-hydroxy-naphthoic aryl amide about an equal part of a vegetable gum.

3. Process for the manufacture of preparations of 2:3-hydroxy-naphthoic aryl amides giving stable solutions in dilute alkali which comprises incorporating into the 2:3-hydroxy-naphthoic aryl amide about an equal part of a gummy matter.

4. Process according to claim 2 wherein the vegetable gum is gum arabic.

5. Process according to claim 2 wherein the vegetable gum is dextrin.

6. Process according to claim 2 wherein the vegetable gum is gluten.

7. Solutions of 2:3-hydroxy-naphthoic aryl amides whenever prepared or produced by the process of claim 2.

8. Process for the manufacture of preparations of 2:3-hydroxy-naphthoic aryl amides giving stable solutions in dilute alkali which comprises incorporating into the 2:3-hydroxy-naphthoic aryl amide about an equal part of a gummy matter of the class consisting of gum arabic, dextrin and gluten.

9. As a new composition of matter, an alkaline solution comprising a 2:3-hydroxy-naphthoic acid aryl amide and a vegetable gum.

10. As a new composition of matter, an alkaline solution comprising a 2:3-hydroxy-naphthoic acid aryl amide, a vegetable gum and a sulphonated oil.

RICHARD FRANK GOLDSTEIN.
ALEXANDER YOUNG LIVINGSTONE.